United States Patent Office 2,862,767
Patented Dec. 2, 1958

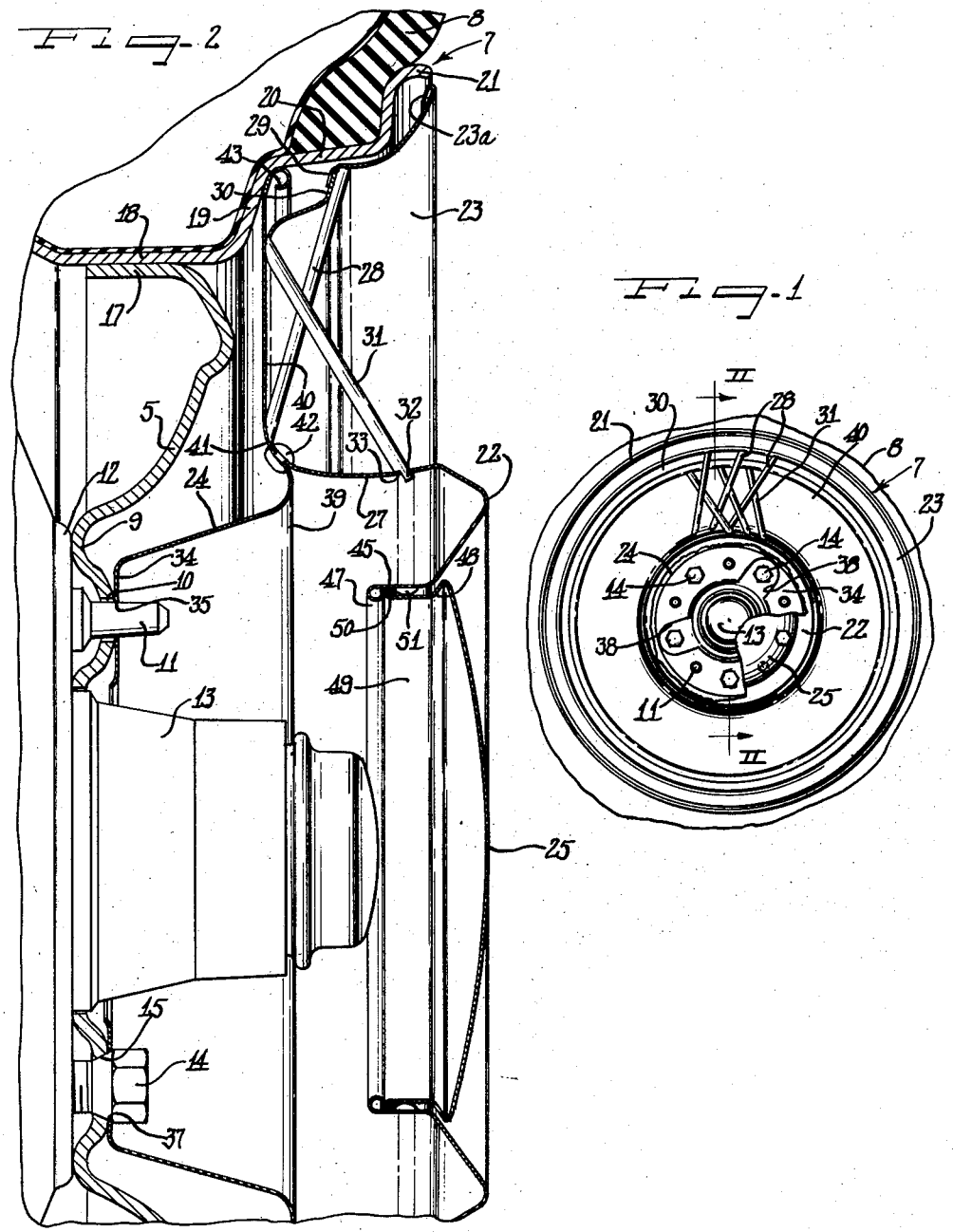

2,862,767

WHEEL COVER

George Albert Lyon, Detroit, Mich.

Application March 3, 1953, Serial No. 339,977

8 Claims. (Cl. 301—37)

The present invention relates to improvements in wheel structures and more particularly concerns the ornamental and protective covering of the outer sides of vehicle wheels.

An object of the present invention is to provide a wheel structure of non-spoke type with a cover that simulates a wire spoke wheel.

Another object of the invention is to provide a wheel structure having novel bolt-on cover mean with means for access through the cover to the attachment bolts.

A further object of the invention is to provide an improved cover for the outer side of a vehicle wheel.

Still another object of the invention is to provide an improved bolt-on type of wheel cover.

Yet another object of the invention is to provide a novel wire spoke wheel simulating cover for disposition at the outer side of a non-spoke wheel.

Other objects, features and advantages of the present invention will be readily apparent in the following detailed description of a preferred embodiment thereof taken in conjuction with the accompanying drawing in which:

Figure 1 is a side elevational view of a wheel structure, with certain portions broken away for clarity of illustration and with certain other portions indicated schematically; and Figure 2 is a fragmentary enlarged diametrical sectional view taken substantially on the line II—II of Figure 1.

A vehicle wheel with which the present invention is especially useful comprises a wheel body 5 which is attached to a tire rim 7 of the drop center multi-flanged type especially adapted to support a pneumatic tire and tube assembly 8.

The wheel body 5 has a central dished bolt-on flange 9 which is provided with aperatures 10 for reception of locating pins 11 projecting axially outwardly in symmetrically spaced relation from a hub flange 12 of a central hub structure 13 of a vehicle axle assembly. Alternating with the locating pins 11 are cap screws 14 which extend through appropriate apertures 15 in the bolt-on flange 9 alternating in symmetrical series with the pin apertures 10.

About its outer margin the wheel body 5 has a generally axially inwardly extending attachment flange 17 which is secured in a suitable manner to a base flange 18 of the tire rim 7. Extending generally radially outwardly from the outer side of the base flange 18 is a side flange 19 which merges with a generally axially and radially outwardly extending intermediate flange 20 extending to and joining a terminal flange 21.

It will be observed that the wheel thus described is of the disk spider type, and of fairly unattractive outer appearance. Moreover, the attachment screws 14 and the hub structures 13 are preferably protected against dirt. Accordingly, it is desirable to provide a cover for the outer side of the wheel.

According to the present invention a wheel cover is provided which caters to the current popular fad for ornamental wire spoke wheels by affording an acceptable simulation at substantially lower cost while retaining all of the advantages of a disk spider wheel over an actual wire spoke wheel. To this end a cover assembly is provided comprising an inner annular spoke carrying cover member 22, an outer annular spoke carrying member 23, a supporting member 24, and a central closure cap 25.

The annular cover members 22 and 23 are of substantially differential diameter, with the inner annular cover member 22 of substantially smaller diameter and provided with a generally axially extending radially outer side wall flange 27 in general simulation of the side wall of a large wire wheel hub. From the inner edge of the side wall flange 27 extends a series of uniformly spaced generally peripherally clockwise and radially and axially outwardly angled spoke simulating integral extensions 28. The cover member 22 is preferably formed from suitable sheet metal such as stainless steel or brass and the spoke extensions 28 are rigidified by forming them from strip extensions of the flange 27 into half round, three-quarter round or full round form. At their outer extremities, the spoke extensions 28 are provided with respective attachment flanges 29 that extend angularly inwardly therefrom and are secured through appropriate apertures in an intermediate annular generally axially outwardly facing shoulder 30 in the annular outer cover member 23.

For cooperation with the inner annular cover member 22, the outer annular cover member 23 is of a diameter to substantially cover the outer side of the tire rim and it extends radially and axially inwardly and has at its inner edge a series of generally radially inwardly and axially outwardly and peripherally angularly clockwise directed spoke elements 31 complementary to and disposed in cooperative crossing relation to the spoke elements 28. The cover member 23 is made from appropriate sheet material such as stainless steel or brass and may be rolled to shape. The spoke extensions 31 at the inner edge of the member 23 are formed initially as strip extensions that are shaped to half round, three-quarter round, or full round form rigidity and to simulate wire spokes. At their inner terminals, the spoke elements 31 are provided with attachment lug extensions 32 which extend retainingly into respective apertures 33 provided therefor in the side wall flange 27 of the inner cover member 22 adjacent to the annular crown of the member 22.

At its outer margin the outer cover member 23 is provided with an underturned marginal reinforcing and finishing flange 23a. As will be observed, the cover member 23 is dimensioned to lie in adjacent spaced relation to the tire rim.

For supporting the assembled cover members 22 and 23 and attaching the cover to the wheel, the inner cover member 24 is secured to the outer cover assembly and is constructed and arranged for attachment to the bolt-on flange 9 of the wheel. To this end, the inner supporting cover member 24 is formed as a sheet metal annulus having a dished central bolt-on flange 34 having appropriate apertures 35 for reception of the locating pins 11 and other appropriate apertures 27 for engagement therein of the frustro-conical retaining shoulders of the cap screws 14 for securing the bolt-on flange 34 to the bolt-on flange 9 of the wheel body. As will be seen in Figure 1, the cover bolt-on flange 34 is cut out at one or more, here in two places, as indicated at 38, to clear two of the cap screws 14 so that the wheel can be preliminarily attached by two of the screws before the cover is attached to the wheel by the retaining cap screws 14.

Axially and radially outwardly from the bolt-on flange 24, the inner supporting cover member 24 has an annular rib-like formation 39 from which extends generally radially outwardly flange 40 having a reentrant, concave juncture 41 with the rib 39 to provide a seat within which is nested the annular inner complementary turned margin of the flange 27 of the annular cover member 22. Means such as rivets 42 secure the inner margin of the cover member 22 onto the annular seat 41.

The cover flange portion 40 extends radially outwardly in underlying relation to the crossing spokes 28 and 31 and projects radially beyond the inner margin of the member 23 into underlying relation thereto. The radially outer margin of the flange 40 is turned up and back on itself to provide a reinforcing and finishing bead 43, the diameter of which is such as to lie within the re-entrant annular groove defined at juncture of the side flange 19 with the intermediate flange 20 of the tire rim. By preference, the flange 40 is flexible and normally is biased axially inwardly into spaced relation to the inner margin of the cover member 23. As an incident to bolting of the cover into position on the wheel, the flange 40 is placed under resilient deflection. This causes the flange 40 to become tensioned and engaged by the inner extremity of the annular cover member 23 and serves to retain the cover against rattling on the wheel in service. Furthermore, by the opposing, shouldering relation of the marginal bead extremity 43 of the flange 40 relative to the adjacent inner portion of the intermediate flange 20, the cover is maintained against any tendency toward radial movement that may result from looseness by virtue of clearance of the apertures 35 and 37 with respect to respectively the locating pins 11 and the cap screws 14.

It will also be observed, that by having the flange 40 closing the back of the spoke area of the cover, passage of dirt through the cover in the spaces between the spokes will be provided. The radially inner portion of the cover member 24, as well as the annular innermost of the outer cover members 22 cooperate with the flange 40 to exclude dirt from the bolt-on flange 9 as well as the hub structure 13. Of course, with certain wheels it may be desirable to afford air circulation through the spaces between the spokes and the wheel, and under such circumstances the flange 40 may be provided with air circulation openings. However, the wheel shown herein does not afford air circulation openings.

For decorative purposes, the axially outer annular cover members 22 and 23 as well as the spokes 28 and 31 may be polished or plated to provide a lustrous finish, while the background flange 40 may be painted black or other preferred dark color so as to set off the spokes to good advantage. On the other hand, some other decorative relationship may be adopted, such as a preferred coloring of the spoke elements while the background flange 40 may be of a polished or plated, lustrous finish or a contrasting color.

For ready access through the cover member 22 to the wheel bolts, the member 22 is equipped with means for detachably maintaining the central closure cap member 25 in snap-on, pry-off relation to a central opening through the member 22. To this end, the cover member 22 is provided with an annular generally axially inwardly central opening defining flange 45 having its inner extremity or margin curled inwardly upon itself to provide a reinforcing bead 47. The cap member 25 is provided with an annular underturned marginal flange 48 having an axially inward extension flange portion 49 dimensioned to telescope within the flange 45 in slight clearance relationship. At its inner extremity, the flange 49 is provided with a small out-turned curled reinforcing bead 50 adapted in the assembly of the cap member 25 with the cover member 22 to seat upon the bead 47 and thus maintain the underturned flange 48 in its radially inwardly directed portion in slightly spaced relation to the opposing shoulder defined by the member 22. Retaining interengagement between the bead 50 and the member 22 is accomplished by the provision of radially inwardly directed protrusions or nodes 51 in the flange 45, sometimes referred to as retaining bumps which are spaced axially outwardly from the shoulder bead 47 sufficiently to accommodate the cap rim bead 50 in retaining relation. Thereby, the cap member 25 is adapted to be snapped into position by axially inward pressure to press the resilient bead 50 past the retaining bumps 51. Removal of the cap 25 is accomplished by inserting a pry-off tool in the gap between the marginal shoulder defined by the flange 48 and the opposing portion of the member 22 and exerting pry-off leverage. Such leverage is assisted by the provision of the substantially rib-like formation of the crown extremity of the member 22 spaced radially outwardly and axially outwardly from the shoulder extremity of the cap 25.

It will be understood that modifications and variations may be effected without departing from the scope of the novel concepts of the present invention.

I claim as my invention:

1. In a wheel structure including a tire rim and a wheel body having a central bolt-on flange, a cover assembly for the outside of the wheel comprising a first cover member of annular form for disposition opposite the tire rim and a second annular cover member for disposition opposite the bolt-on flange, said first and second cover members being connected together by spoke-like elements thereof, and a third cover member carrying and engaging both of said first and second cover members and having a bolt-on flange cooperable with the bolt-on flange of the wheel body.

2. In a wheel structure including a tire rim and a wheel body having a bolt-on flange, a cover member having a bolt-on flange for retaining cooperations with the bolt-on flange of the wheel body and a flange for resilient deflectional tension against the tire rim, said cover member having thereon other cover components including a portion for overlying the tire rim and engaged by the resiliently deflectional flange when it is under tension in order to retain the cover against rattling on the wheel.

3. In a cover for disposition at the outer side of a vehicle wheel, an annular inner cover member, an annular outer cover member in spaced relation thereto, each of said members having spoke extensions on the adjacent portions thereof interconnecting with the other of said cover members in a crossing relationship, and a supporting member behind said annular cover members and having a central bolt-on flange for attachment to a wheel, said inner annular cover member being riveted to said supporting member, said supporting cover member having a resilient annular flange extending beyond the riveted portion thereof behind the spoke extensions and being axially flexible into engagement with said annular outer cover member.

4. In a cover for disposition at the outer side of a vehicle wheel, radially inner and outer spaced cover portions having spokes connecting the same and providing openings through the spokes, means behind the radially inner cover portion for attachment of the cover to the wheel, and a radially extending flange attached to and projecting from one of said cover portions behind said spokes to close the openings through the spokes, and the other of said cover portions having a generally axially inwardly directed shoulder engageable with said flange.

5. In a wheel structure including a tire rim and a wheel body having a bolt-on flange, a cover for disposition at the outer side of the wheel including an annular cover member having a generally axially inwardly directed bolt-on flange portion engageable retainingly with the bolt-on flange of the wheel body and provided with a generally radially outward extension annular flange portion thereof for overlying the wheel body radially outwardly from the bolt-on flange and including an outer margin engageable under resilient tension against an axially outwardly facing annular portion of the tire rim, said flange extension having adjacent to juncture thereof with the axially inwardly directed bolt-on flange an inset generally radially and axially outwardly facing annular groove, and a cover assembly including an annular seating portion nested in said groove and secured therein, said cover assembly including radially inner and outer portions thereof for overlying respectively the axially inwardly directed bolt-on flange portion of the first mentioned cover member and a radially outwardly directed portion for overlying said flange extension.

6. In a cover for disposition at the outer side of a vehicle wheel, said cover including a circular central portion having an axially inwardly extending annular flange provided at its axially inner extremity with an inturned annular bead providing an axially outwardly facing seating shoulder, said flange having radially inwardly directed cover retaining elements thereon spaced axially outwardly from said shoulder, and a hub cap for closing the opening defined by said flange, said hub cap including an annular flange extending generally axially and of a smaller diameter than said axial cover flange and telescopically receivable therein, said hub cap flange having an axially inner terminal outturned bead engageable with said shoulder and of a diameter to engage retainingly behind said retaining means on said cover flange in snap-on pry-off relation.

7. In a wheel structure including tire rim and body parts, a cover assembly for disposition over the outer side of the wheel including radially spaced connected portions for overlying respectively the rim and body parts, one of said cover portions having means engageable with one of said wheel portions for retaining the cover on the wheel, one of said cover portions having extending therefrom into a position behind the other of the cover portions a resilient part engageable under resilient tension with the wheel part which said other cover portion overlies, and said other cover portion having a part thereof directed axially inwardly for engagement with said resilient part for retaining the cover against rattling on the wheel.

8. In a wheel structure including a tire rim and a wheel body having a bolt-on flange, a cover member having a bolt-on flange for retaining cooperation with the bolt-on flange of the wheel body and a flange for resilient deflectional tension against the tire rim, said cover member having thereon other cover components including a portion for overlying the tire rim and engaged by the resiliently deflectional flange when it is under tension in order to retain the cover against rattling on the wheel, said cover flange having a circular edge engageable with an opposing circular portion of the tire rim to maintain a centered relation of the cover relative to the wheel.

References Cited in the file of this patent
UNITED STATES PATENTS

| | | |
|---|---|---|
| D. 168,977 | Ryerson | Mar. 3, 1953 |
| 1,814,161 | Hynan | July 14, 1931 |
| 2,016,395 | Sinclair | Oct. 8, 1935 |
| 2,031,092 | Begg | Feb. 18, 1936 |
| 2,069,952 | Hoffman | Feb. 9, 1937 |
| 2,147,020 | Fergueson | Feb. 14, 1939 |
| 2,166,216 | Lyon | July 18, 1939 |
| 2,368,250 | Lyon | Jan. 30, 1945 |
| 2,676,850 | McLeod | Apr. 27, 1954 |

FOREIGN PATENTS

| | | |
|---|---|---|
| 714,587 | France | Sept. 7, 1931 |